Patented Mar. 31, 1942

2,278,291

UNITED STATES PATENT OFFICE 2,278,291

MATRIX

Hylton Swan, Upper Montclair, and Sigfried Higgins, Verona, N. J., assignors, by mesne assignments, to Bakelite Corporation, a corporation of New Jersey No Drawing. Application November 24, 1936, Serial No. 112,468

11 Claims. (Cl. 101—401.1)

This invention relates to the preparation of matrices suitable for printing plates, sound records, and similar articles from that type of plastic materials in sheet form in which a heat-hardening synthetic resin such as a phenol-formaldehyde resin constitutes the binder. These sheet materials when applied are in an intermediate condition wherein the resin binder first softens and flows and then sets up to an infusible insoluble form under the application of heat and pressure.

The preparation of a matrix from plastic sheet materials presents a number of problems. One such problem is that of obtaining smooth floors and well accentuated depressed or printing character areas in small type characters such as the e's and the o's and the s's. Another problem is that of minimizing lateral flow of the material over the surface of the pattern or type form to which it is applied under the pressures required for securing an adequate impression. A further problem encountered is that of shrinkage of the material upon hardening or setting. Still another and unexpected difficulty has been the failure of securing satisfactory printing plates from completely molded matrices and found to be caused by the entrapment of air in the molding of the printing plates from the matrix; this has been particularly noticeable in the preparation of rubber printing plates which are now finding an extensive and rapidly increasing use in the printing art.

The foregoing problems arise, for instance, in the manufacture of matrices from paper or loosely matted fibrous materials such as blotting paper or the like coated with resin varnish. One reason for this is that it is found difficult to obtain a sharp definition of the depressed areas of the matrix (i. e. those which form the printing (i. e. the relief) areas in a printing plate molded therefrom) without having the relief areas of the matrix subjected to pressure as well; in other words the relatively high pressures required in such materials for securing the perpendicular flow necessary to an accurate definition of the depressed areas of a matrix, result in the formation of hardened, smooth and compressed resin-coated surfaces on the matrix relief areas with sharp or square cornered edges that have the objection that they prevent escape of air and its entrapment in the subsequent preparation of a printing plate. Then again in addition to the flow perpendicular to the surface there is a decided amount of flow laterally or parallel to and on the surface when coated sheets are used, as indicated by the marked resin concentrations at the edges. Also in the molding of varnish-coated sheets considerable shrinkage occurs which manifests itself in sticking to the pattern and in distortion of the matrix upon separation from the pattern.

In the molding of the sheet materials into articles, such as matrices for printing plates or sound records, it is the vertical flow, i. e. compressibility or "embossibility" without objectionable lateral flow, which is of service. Lateral flow and high shrinkage factor that characterize varnished sheets can be reduced in them by limiting the resin content to about 10–20% instead of the 40–50% normally present; but with such low resin compositions other difficulties arise, for pressures at least as high as 1000 lbs. to the sq. in. are made necessary and such high pressures tend to cause distortion and displacement of the pattern from which the matrix is molded, particularly if the pattern is type matter set up in a form. Moreover, low resin content compositions are deficient in water resistance, but more especially are they lacking in rigidity and mechanical strength required in matrices, and accordingly the matrices do not stand up under repeated moldings at the pressures required for the molding of printing plates; for example the manufacture of rubber printing plates requires pressures of from 500 lbs. to 800 lbs. to the sq. in.

The present invention provides a matrix having as particularly marked and distinguishing characteristics smooth floors with sharpness of definition for the depressed areas (which form the printing areas in a printing plate molded therefrom) and rough matte-like surfaces with rounded edge contours for the relief areas. By means of such matrices it is possible to produce printing plates such as rubber plates with clearly defined and accurate printing areas, since the flow or movement of rubber laterally over the rough matte-relief surfaces of the matrix is retarded and the perpendicular flow is encouraged. A further advantage residing in rough matte-relief areas is that they permit entrapped gases to escape and the tendency of the rubber to prematurely seal over the depressed areas is overcome.

Sheet compositions, suitable for the purposes of this invention by means of which matrices with the characteristics noted can be obtained, are distinguished by their improved compressibility or embossibility and substantial freedom from lateral surface flow. Furthermore their shrinkage factor is relatively small, not exceeding .001 to .002 inch per inch, and the compositions after molding readily release from the pattern.

Briefly stated the invention depends upon moldable compositions in sheet form having a fibrous content prepared as a pulp with the heat-hardening resinous binder distributed as discrete particles throughout the pump; the resin distribution is obtained by adding it in the form of a suspension to the wet pulp in a beater or while the pulp is dispersed in a large volume of water. But in order to have the requisite degree of compressibility or embossibility in these sheet compositions, particularly at the low pressures desirable in the formation of matrices, it has been found essential to have in the pulp stock short fibers such as mechanical pulp or ground wood, asbestos fibers, etc. Preferably long or matting fibers, such as is obtained in the chemical treatment of wood, rags or the like, are included to give coherence and strength to a sheet prepared from the pulp so that it can be suspended for drying and handled without disintegrating; the long fibers are also found to be of assistance in reducing lateral flow. A sheet or board is built up to the desired thickness from the mixed pulp and dried; for printing plate matrices the thickness found preferable lies within a range of .125 to .300 inch. The resin content can vary from 40 to 60%, and about 50% is found desirable. For example by the admixture of an equal part of mechanical or short pulp, sheets are obtainable with a "mils compressibility" (i. e. the difference in mils thickness between molded and unmolded stock) of from 40–45% for stock of the thicknesses above indicated, whereas the mils compressibility of a composition prepared from chemically treated or long fiber pulp alone does not exceed 30–35%. Moreover the comparative density of the composite fibers is low, for the dried unmolded sheets have an average density of from 10–12 grams per cubic inch while compositions prepared from long fibers alone have a density of about 16 grams per cubic inch. With the high compressibility made possible by the low density of the order indicated, molding under pressures as low as 500 lbs. per sq. in. and less is found to result in sharp definition of the depressed areas of a matrix without material compression of the relief areas, thus leaving the latter surfaces in a rough uncompressed condition. Low pressures of this order also are found to make unnecessary side bars or confining barriers around the matrix material, since the lateral flow is then practically negligible and there is no occurrence of objectionable resin concentration.

It has been found that the compressibility of the compositions can be further increased to permit molding pressures as low as 100 lbs. per sq. in. or even less for sharply defining the depressed areas by including in the composition of resin and mixed fibers a finely ground molding material made from a heat-hardening resin and wood flour as by hot-rolling them together; this further improves the perpendicular flow. Such a molding material can be added to the wet pulp in the beater and the beater mixture then run onto screens to form a sheet or the building up of a board on a cylinder machine. For instance compositions so prepared and containing about 400 parts of molding material in a pulp of 200 parts each of short and long fibers have a mils compressibility of 50–55% and an unmolded density of 0.6 to 0.7.

It has been further found that an improvement is obtained by coating on the surface to be molded into a matrix a thin layer of a molding mixture composed of wood flour and a heat-hardening resin reduced to a finely divided condition as ordinarily made for hot-molding. This coating can be applied in various ways as for example by brushing or by spraying in the form of an aqueous suspension or a suspension in an organic liquid such as alcohol, toluol or a mixture containing water and organic liquid. After the coating is applied the sheet is dried at a temperature sufficient to volatilize the liquid used in the dispersion but insufficient to advance or harden the resinous content to any substantial degree. Such a coating ensures a rough matte surface and is generally about 10 mils in thickness and usually not exceeding 30 mils.

By the inclusion of the resinous binder as particles in the wet pulp its proportion in the composition can be high without excessive shrinkage in the forming of the matrix; for instance the resin content can vary from 40–60% but about 50% is preferred in the manufacture of matrices for printing plates. Due to the high resin content the finished matrix becomes a rigid substantial article capable of withstanding pressures up to 2000 lbs. per sq. in. as may be required in the molding of printing plates therefrom, and it maintains its rigidity of form even after many repeated moldings.

The sheet or board so prepared can be used as a continuous sheet or it may be cut or punched into various shapes. The sheet can be shaped in a hot press, as for example, into a printing plate matrix, as follows:

The original to be reproduced, such as a set up of type, is locked in a chase and placed on the lower platen of a press heated to a temperature of 275° F. A sheet of the desired size is then positioned in contact with the type and the press closed. A pressure is applied by means of the upper platen of the press and maintained for about 5–10 minutes. The temperature of the heated platens is then lowered, while still maintaining the pressure, and when the press has been cooled to about 100° F. or less, it is opened and the finished matrix discharged; or, it is possible to omit the cooling step and discharge the hardened matrix hot from the press. Examination of the finished matrix shows the depressed areas to be highly polished, clean-cut, accurate replicas of the original type matter; the indented corners of the depressed areas are sharp and completely filled out. The topical or relief areas of the matrix, however, although completely hardened and resistant to further deformation, are incompletely molded in that they still retain a matte surface which rounds smoothly into the depressed areas.

This highly important feature of the invention, namely a printing plate matrix having highly polished and accurately formed depressed areas with relatively uncompressed, i. e. incompletely molded, and rough relief areas arises out of the low pressures used in molding. Since the applied pressure is effective in molding the depressed areas but not enough to fill out the relief areas of the matrix (i. e. the depressed portion of the original type form) the relief areas are not smoothly molded but left rough and unfinished by the effect of the low pressure or substantially no pressure on those areas. These rough and unfinished surfaces round smoothly into the finished depressed areas and are a great aid in obtaining accurately molded plates when the matrix is used as a mold.

A matrix possessing a surface as above described has many valuable features. From such a matrix it is possible to produce printing plates, for example, from rubber, cellulose esters or ethers, vinyl esters, etc. with clearly defined accurate characters. The lateral flow or movement of the printing plate material over the topical surfaces of the matrix is retarded due to its rough matte-like character, while the perpendicular flow into the smooth, depressed surfaces of the matrix is aided; and these two factors, working together, produce a highly satisfactory, clear, distinct, accurate printing plate. Lines and characters on the printing plate are form with sharp, clean-cut, topical faces while the body portions of the lines and characters form smooth, rounded fillets with the base of the printing plate. Moreover, there is no tendency, such as occurs when the topical areas of the matrix are smooth, for the rubber or the like to seal over the depressed areas of the matrix, thereby entrapping air in these areas so that it does not completely fill out the characters in the matrix. Instead, the rough, matte, topical surfaces of a matrix prevent sealing, permit gases to escape, and a printing plate possessing perfectly formed characters results.

The printing plate may also be formed from a synthetic resin composition, but in this case it is found advisable to provide a particular parting medium, namely, a colloidal dispersion of graphite. A suitable preparation of graphite in this form is that sold commercially under the name of Aquadag.

In addition to the formation of printing plate matrices, the sheets herein described can also be used as matrices for the reproduction of sound recordings; for example, a sheet as described can be molded against an aluminum original of a sound recording, and from the matrix so produced it is possible to faithfully reproduce the recording, for example, in a cellulose ester or a vinyl ester composition.

By way of illustration the following examples are descriptive of the preparation of resin-fiber sheet compositions suitable for the making of matrices.

*Example 1.*—A resin is prepared by heating for about twenty minutes at 120° C. approximately equimolecular quantities of cresol and 40% formaldehyde solution along with about 30% (based on cresol) of rosin in the presence of about 3½% (based on cresol) of an alkaline catalyst such as 28% aqueous ammonia or an equivalent amount of sodium or barium hydroxide. The reaction product is cooled; then the whole dehydrated, preferably under diminished pressure until a sample of the resin, when dropped into cold water, congeals to a hard brittle mass. While still warm the dehydrated resin is discharged from the still into a ball mill containing about 2 parts of water for each part of resin added. Water and resin are milled together to form a smooth even resin-water dispersion which is charged into the beater of a paper mill containing about 20 parts white water to each part dry resin added, and there beaten for about an hour with a pulp composed of equal parts of rag and news fiber in the proportion of about 450 parts dry resin, 200 parts news (short) fiber, and 200 parts rag (long) fiber. Dye and additional amount of lime for fixing the dye into the fiber are added at this point if desired. The beater resin-pulp composition is then built up to the desired thickness (.125 to .300 inch) on a paper machine of the wet type and dried by suspending the sheet in a loft for 24 to 48 hours through which dry air at a temperature of 100 to 120° F. is circulated. After drying the sheets may be calendered to smooth and straighten them. They are then cut to size and such sheets are suitable for fashioning printing plate matrices from zincos and electros, using molding pressures of 500 lbs. per sq. in. and temperature of 275 to 300° F.

The resin content of such sheets is about 40 to 50%, their unmolded density is about .6 to .7 and their mil compressibility about 40–45%.

*Example 2.*—A resin is prepared by reacting equimolecular quantities of cresol and formaldehyde solution (40%) in the presence of an alkaline catalyst, such as sodium or barium hydroxide in an amount equal to .8–1% of the phenolic constituent, until a sample withdrawn from the reaction mix and cooled, separates into two layers, an aqueous layer and a resin layer. The reaction mix is dehydrated, preferably under diminished pressure until a viscous liquid resin of about 70% solids content are obtained. 600 parts of this wet resin is mixed in a kneader or other suitable mixing device with 200 parts news fibers and 200 parts kraft fibers until a smooth homogeneous mix is obtained when it is charged into the beater with 400 parts of molding material fines (about 100 mesh), such as may be prepared in the known manner from about equal parts of a synthetic resin such as a potentially reactive phenol-formaldehyde resin and a filler such as wood flour. The resin-pulp and molding material compositon is brushed out in the beater; and the beater mix, comprising about 1–2% resin fiber suspension in water, is carried on the felt to the make-up roll where a sheet built up to the desired thickness is then dried as described in Example 1. The sheet is then cut to the desired size and can be molded at pressures as low as 100 lbs. per sq. in. and at temperatures of 275–300° F. It possesses better embossibility than the sheet described in Example 1, has an unmolded density of 0.6–0.7, and a mils compressibility of 50–55%.

*Example 3.*—A sheet is prepared as described in Example 1 or Example 2, and the surface spray coated with an aqueous suspension containing about 40% molding material fines (60 mesh). The thickness of the coating applied averages about .020". The coated sheet is dried in an oven at a temperature of 100° F. for about 60 minutes, and it is then suitable for making matrices, particularly from the type matter and, when made in accordance with Example 2, can be molded at pressures of 100 lbs. per sq. in. and temperatures of 275–300° F.

While in the above examples resins of the phenol-formaldehyde type have been found to be most satisfactory it is feasible to substitute at least in part other heat-reactive resins, such as urea-formaldehyde resins, anilineformaldehyde resins, alkyd resins, etc. Also, as indicated in Example 1, part of the synthetic resins can be replaced with a natural resin such as rosin or gum accroides. Permanently fusible or slowly hardening synthetic resins such as novolaks or oil-soluble phenol-formaldehyde resins, or a heat non-convertible alkyd resin can be added in part; or novolaks made hardenable by the admixture of hexamethylenetetramine can be substituted for the heat-hardening resins. The resin content can be widely varied but for printing plate matrices about 40–60% or preferably 50% is used.

In the preparation of the resin-pulp compositions chemically treated pulp or long fiber other than rag or kraft, such as sulphite or sulphate pulp, can be used; and instead of news pulp other mechanical or short fiber pulp, such as ground wood can be substituted; or asbestos fiber can be used. Generally, about equal parts of chemical pulp and mechanical pulp are preferred, although 2 parts of chemical pulp to 1 part of mechanical have given satisfactory results as have 1 part of chemical to 2 to 3 parts mechanical pulp.

If molding material fines are added to the resin-pulp composition, it is usually advisable to use a liquid resin in the preparation of the pulp composition. About 30–40% of fines (based on dry weight of board) is usually added, although compositions containing as little as 20% and as high as 75% of fines has been found useful.

Non-fibrous fillers such as clay, talc, silica, etc., can be incorporated and dyes, pigments, etc., can be added as indicated.

While the sheets are particularly described as suitable for the making of printing plate matrices, they are also useful for the making of sound record matrices, placques, signs, embossing counters, or other molded articles which require no appreciable lateral flow.

What is claimed is:

1. Matrix molded by compression under pressures of five hundred pounds or less from a sheet composition comprising a pulp stock of long and short fibers in proportions ranging from about two parts by weight of long fibers to from one to six parts of short fibers and containing from substantially forty to sixty per cent based on the weight of fibers of a heat-hardening type of resin added in discrete particle form, said stock having incorporated therein from about twenty and up to seventy-five per cent based on the dry weight of the stock of molding material fines prepared from a heat-hardening resin and a fibrous filler and having a surface coating of molding material fines, said matrix being characterized by a smooth floor with sharp definition in its depressed areas and an unfinished matte-like surface with rounded edge contours for its relief areas.

2. Matrix molded by compression under pressures of five hundred pounds or less from a sheet composition comprising a pulp stock of long and short fibers in proportion, ranging from about two parts by weight of long fibers to form one to six parts of short fibers and containing from substantially forty to sixty per cent based on the weight of fibers of a heat-hardening type of resin added in discrete particle form, said stock having incorporated therein from about twenty and up to seventy-five per cent based on the dry weight of the stock of molding material fines prepared from a heat-hardening resin and a fibrous filler, said matrix being characterized by a smooth floor with sharp definition in its depressed areas and an unfinished matte-like surface with rounded edge contours for its relief areas.

3. Matrix molded by compression from a sheet composition comprising a pulp stock of short fibers for imparting compressibility and including long fibers for preventing objectionable lateral flow, said stock having incorporated therein from substantially forty to sixty per cent based on the weight of fibers of a heat-hardening type of resin added in discrete particle form from about twenty and up to seventy-five per cent based on the dry weight of the stock of molding material fines prepared from a heat-hardening resin and a fibrous filler.

4. Composition suitable for the manufacture of matrices by compression molding comprising in sheet form a pulp stock of long and short fibers in proportions ranging from about two parts by weight of long fibers to from one to six parts of short fibers, and containing from substantially forty to sixty per cent based on the weight of fibers of a heat-hardening resin in discrete particle form, said stock having incorporated therein from about twenty and up to seventy-five per cent based on the dry weight of the stock of molding material fines prepared from a heat-hardening resin and a fibrous filler and having a surface coating of molding material fines, said composition being characterized by a mils compressibility of from forty to fifty-five per cent at pressures approximating 500 pounds per square inch.

5. Composition suitable for the manufacture of matrices by compression molding comprising in sheet form a pulp stock of long and short fibers in proportions ranging from about two parts by weight of long fibers to from one to six parts of short fibers and containing from substantially forty to sixty per cent based on the weight of fibers of a heat-hardening resin in discrete particle form, said stock having incorporated therein from about twenty and up to seventy-five per cent based on the dry weight of the stock of molding material fines prepared from a heat-hardening resin and a fibrous filler, said composition being characterized by a mils compressibility of from forty to fifty-five per cent at pressures approximating 500 pounds per square inch.

6. Composition suitable for matrix manufacture by compression molding comprising in sheet form a fibrous base having a resinous binder incorporated therewith and a surface coating on said base comprising a dried suspension of molding material fines.

7. Composition suitable for matrix manufacture by compression molding comprising in sheet form a fibrous base having a resinous binder incorporated therewith and a surface coating on said base of a dried suspension of molding fines, said coating being ten mils or more in thickness.

8. In a method of coating a surface that comprises preparing a finely divided mixture including cellulose particles impregnated with a thermosetting substance, suspending said mixture in a volatile non-solvent liquid vehicle, substantially all of the thermosetting substance in the resulting suspension being undissolved, applying said suspension to said surface by spraying, and finishing the resulting coating by hot-pressing.

9. In a method of coating a surface that comprises preparing a finely divided mixture including cellulose particles impregnated with a thermosetting substance, suspending said mixture in water, substantially all of the thermosetting substance in the resulting suspension being undissolved, applying said suspension to said surface by spraying, drying the resulting coating, and finishing the coating by hot-pressing.

10. In a method of coating a surface that comprises preparing a finely divided mixture including cellulose particles impregnated with a thermosetting formaldehyde-urea composition, suspending said mixture in a volatile non-solvent liquid vehicle, substantially all of the formaldehyde-urea composition in the resulting suspension being undissolved, applying said suspension to said surface by spraying, and finishing the resulting coating by hot-pressing.

11. An article adapted to be finished by hot-pressing including suitable body material, and a dry, continuous adherent surface layer that has been formed by preparing a finely divided mixture including cellulose particles impregnated with a thermosetting substance, suspending said mixture in water to form a composition in which substantially all of the thermosetting substance is undissolved, and applying said composition to said body material by spraying, substantially all of the thermosetting substance in said layer being insoluble in cold water, and said layer being capable of formation by heat and pressure into a substantially flawless coating.

HYLTON SWAN.
SIGFRIED HIGGINS.